United States Patent
Komamura

(10) Patent No.: US 9,517,800 B2
(45) Date of Patent: Dec. 13, 2016

(54) VEHICLE SIDE SECTION STRUCTURE

(71) Applicant: TOYOTA JIDOSHA KABUSHIKI KAISHA, Toyota-shi (JP)

(72) Inventor: Tatsuya Komamura, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/821,919

(22) Filed: Aug. 10, 2015

(65) Prior Publication Data

US 2016/0083014 A1    Mar. 24, 2016

(30) Foreign Application Priority Data

Sep. 19, 2014   (JP) .................................. 2014-191932

(51) Int. Cl.
    *B62D 21/15*    (2006.01)
    *B62D 25/04*    (2006.01)
    *B62D 25/02*    (2006.01)

(52) U.S. Cl.
    CPC ............. *B62D 21/152* (2013.01); *B62D 25/04* (2013.01); *B62D 25/025* (2013.01)

(58) Field of Classification Search
    CPC ..... B62D 21/15; B62D 21/152; B62D 25/025; B62D 25/04
    USPC .......................... 296/187.09, 187.1, 193.06, 203.02, 296/203.03, 209
    See application file for complete search history.

(56) References Cited

U.S. PATENT DOCUMENTS

| 5,246,264 A * | 9/1993 | Yoshii | .................... B62D 25/04 296/1.03 |
| 2001/0020797 A1 | 9/2001 | Saeki | |
| 2016/0016612 A1 * | 1/2016 | Torikawa | ............. B62D 25/025 280/784 |

FOREIGN PATENT DOCUMENTS

| JP | 5-85414 | 4/1993 |
| JP | 10-244959 A | 9/1998 |
| JP | 2001-253365 | 9/2001 |
| JP | 2013-141928 | 7/2013 |

* cited by examiner

*Primary Examiner* — Jason S Daniels
(74) *Attorney, Agent, or Firm* — Oblon, McClelland, Maier & Neustadt, L.L.P.

(57) ABSTRACT

A first opening is formed in a bent portion at a lower end portion of a pillar outer panel, and a second opening is formed in the bent portion at a lower end portion of pillar outer reinforcement. The strength of a front outside portion is reduced at the lower end portions of the pillar outer panel and the pillar outer reinforcement. When load toward the rear oblique inside acts on a lower end portion of a front pillar, the front pillar deforms about an origin at the front outside portions of the pillar outer panel and the pillar outer reinforcement. Namely, the front pillar can be deformed such that a front end portion of a front wheel moves further toward the vehicle width direction outside. The front end portion of the front wheel moves further toward the vehicle width direction outside, thereby promoting toe-out of the front wheel.

4 Claims, 9 Drawing Sheets

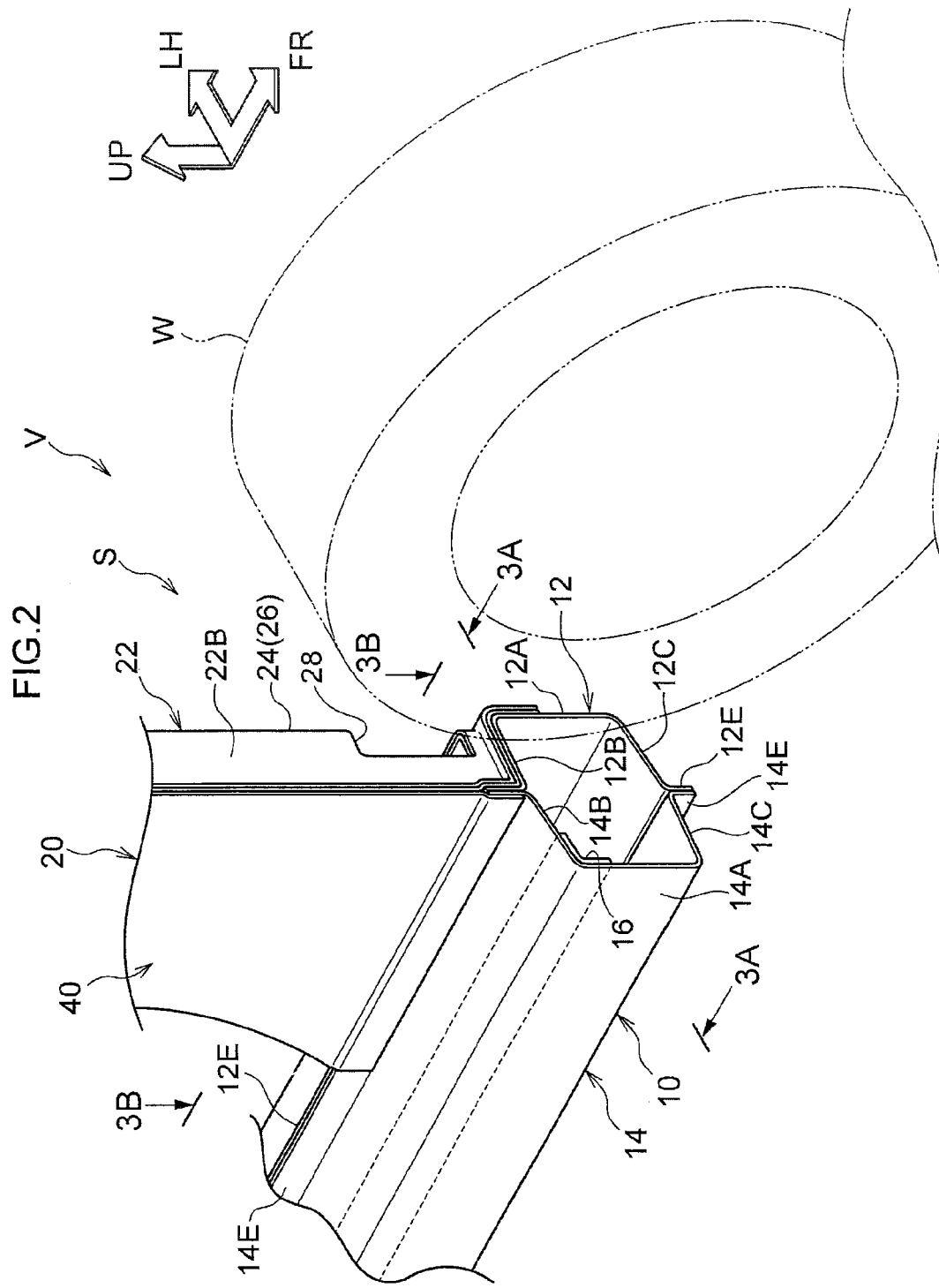

VEHICLE SIDE SECTION STRUCTURE

CROSS-REFERENCE TO RELATED APPLICATION

This application is based on and claims priority under 35 USC 119 from Japanese Patent Application No. 2014-191932, filed on Sep. 19, 2014, which is incorporated by reference herein.

BACKGROUND

1. Technical Field

The present invention relates to a vehicle side section structure around a lower end portion of a front pillar.

2. Related Art

In a vehicle side section structure described in Japanese Patent Application Laid-Open (JP-A) No. 2001-253365 (Patent Document 1), a weakened portion is provided at a lower end portion of a lower pillar. The weakened portion is set with a thinner plate thickness than at other locations. When a front wheel that has been shunted backward in a vehicle front end collision contacts the lower pillar, the weakened portion deforms, absorbing collision energy.

When a colliding body (barrier) is in a front end collision with a vehicle further to the vehicle width direction outside than a front side member of the vehicle (known as a small overlap collision), the colliding body and the vehicle can be moved apart in the vehicle width direction by promoting toe-out of the front wheel (a state in which a front end portion of the front wheel is positioned on the vehicle width direction outside) that contacts the lower pillar. For related inventions, see JP-A No. H05-85414 (Patent Document 2) or JP-A No. 2013-141928 (Patent Document 3).

However, in the vehicle side section structure described above, although the weakened portion is provided at a portion of the lower pillar facing the front wheel, there is no reference to promoting toe-out of the front wheel when the front wheel contacts the lower pillar. The vehicle side section structure described above accordingly leaves room for improvement in this respect.

SUMMARY

In consideration of the above circumstances, an object of the present invention is to provide a vehicle side section structure capable of promoting toe-out of a front wheel in the event of a small overlap collision.

A vehicle side section structure according to a first aspect includes: a rocker extending in a vehicle longitudinal direction at a vehicle rear side of a front wheel; a front pillar configured with a closed cross-section structure and extending from a front end portion of the rocker toward the vehicle upper side; a front pillar outer panel that configures a vehicle width direction outside portion of the front pillar, that is bent into a recessed shape open toward the vehicle width direction inside as viewed in cross-section from the vehicle upper side, and that includes a bent portion configuring a corner at the vehicle front side and vehicle width direction outside of the front pillar outer panel; and a first hole formed either at the bent portion or in the vicinity of the bent portion, at a lower end portion of the front pillar outer panel at a height in a vehicle vertical direction that overlaps with the front wheel.

In the vehicle side section structure according to the first aspect, the rocker is provided extending in the vehicle longitudinal direction at the vehicle rear side of the front wheel, and the front pillar extends from the front end portion of the rocker toward the vehicle upper side. The front pillar is configured with a closed cross-section structure, and the vehicle width direction outside portion of the front pillar is configured by the front pillar outer panel. The front pillar outer panel is bent into a recessed shape open toward the vehicle width direction inside as viewed in cross-section from the vehicle upper side, and the corner at the vehicle front side and vehicle width direction outside of the front pillar outer panel is configured by the bent portion.

In the event that the vehicle is involved in a small overlap collision, the front wheel is shunted backward by the colliding body (barrier). In a small overlap collision, the colliding body enters the vehicle further to the vehicle width direction outside than a front side member of the vehicle, and so the front wheel tends to be shunted backward while undergoing toe-out (a state in which a front end portion of the front wheel is positioned on the vehicle width direction outside). When the front wheel that has been shunted backward toward the vehicle rear side contacts the front end portion of the rocker and the lower end portion of the front pillar, load toward the vehicle rear side and vehicle width direction inside acts on the lower end portion of the front pillar from the front wheel.

The first hole is formed at the lower end portion of the front pillar outer panel. The first hole is formed either at the bent portion, or in the vicinity of the bent portion of the front pillar outer panel, at a height in the vehicle vertical direction that overlaps with the front wheel. The strength of the lower end portion of the front pillar outer panel is accordingly reduced around the corner at the vehicle front side and vehicle width direction outside of the front pillar outer panel. When load toward the vehicle rear side and vehicle width direction inside is input to the lower end portion of the front pillar, the front pillar deforms about an origin at the corner on the vehicle front side and vehicle width direction outside of the front pillar outer panel. In other words, the front pillar (the front pillar outer panel) can be made to deform such that the front end portion of the front wheel moves further toward the vehicle width direction outside (to cause greater toe-out of the front wheel). This thereby enables toe-out of the front wheel to be promoted in a small overlap collision.

A vehicle side section structure according to a second aspect is the first aspect, wherein reinforcement that reinforces the front pillar is provided inside the front pillar; and the reinforcement is formed with a second hole disposed facing the first hole, or formed with a set-back portion that is set back to the vehicle rear side and vehicle width direction inside with respect to the first hole.

In the vehicle side section structure according to the second aspect, the reinforcement that reinforces the front pillar is provided inside the front pillar. The reinforcement is formed with the second hole disposed facing the first hole, or formed with the set-back portion that is set back to the vehicle rear side and vehicle width direction inside with respect to the first hole. This thereby enables the reinforcement to be provided inside the front pillar, while suppressing the reinforcement from obstructing deformation at the periphery of the bent portion of the front pillar outer panel in a small overlap collision.

A vehicle side section structure according to a third aspect is the second aspect, wherein: the front pillar outer panel is configured including a front wall extending from the bent portion toward the vehicle width direction inside, and a side wall extending from the bent portion toward the vehicle rear side; and the set-back portion is configured by a step, or by an angled portion, that forms a closed cross-section with the front wall and the side wall as viewed from the vehicle upper side.

In the vehicle side section structure according to the third aspect, the reinforcement is formed with the step, or the angled portion, and the step or the angled portion configure the set-back portion. The front wall and the side wall of the front pillar outer panel configure a closed cross-section with the step or the angled portion of the reinforcement as viewed from the vehicle upper side. The reinforcement is disposed set back (separated) to the vehicle rear side and the vehicle width direction inside with respect to the bent portion of the front pillar outer panel. This thereby enables the periphery of the bent portion of the front pillar outer panel to be deformed as desired in a small overlap collision, while the reinforcement reinforces the front pillar.

The vehicle side section structure according to the first aspect enables toe-out of the front wheel to be promoted in a small overlap collision.

The vehicle side section structure according to the second aspect enables the reinforcement to be provided inside the front pillar, while suppressing the reinforcement from obstructing deformation at the periphery of the bent portion of the front pillar outer panel in a small overlap collision.

The vehicle side section structure according to the third aspect enables the periphery of the bent portion of the front pillar outer panel to be deformed as desired in a small overlap collision, while the reinforcement reinforces the front pillar.

BRIEF DESCRIPTION OF DRAWINGS

FIG. 2 is a schematic perspective view illustrating the front end portion of the rocker and the lower end portion of the front pillar illustrated in FIG. 1, as viewed from the diagonal front right of the vehicle.

FIG. 6A to FIG. 6D are cross-sections illustrating modified examples of a cross-section profile of front pillar outer reinforcement, as viewed from the vehicle upper side, wherein FIG. 6A is a cross-section illustrating a first modified example, FIG. 6B is a cross-section illustrating a second modified example, FIG. 6C is a cross-section illustrating a third modified example, and FIG. 6D is a cross-section illustrating a fourth modified example.

DETAILED DESCRIPTION

Figure 1:
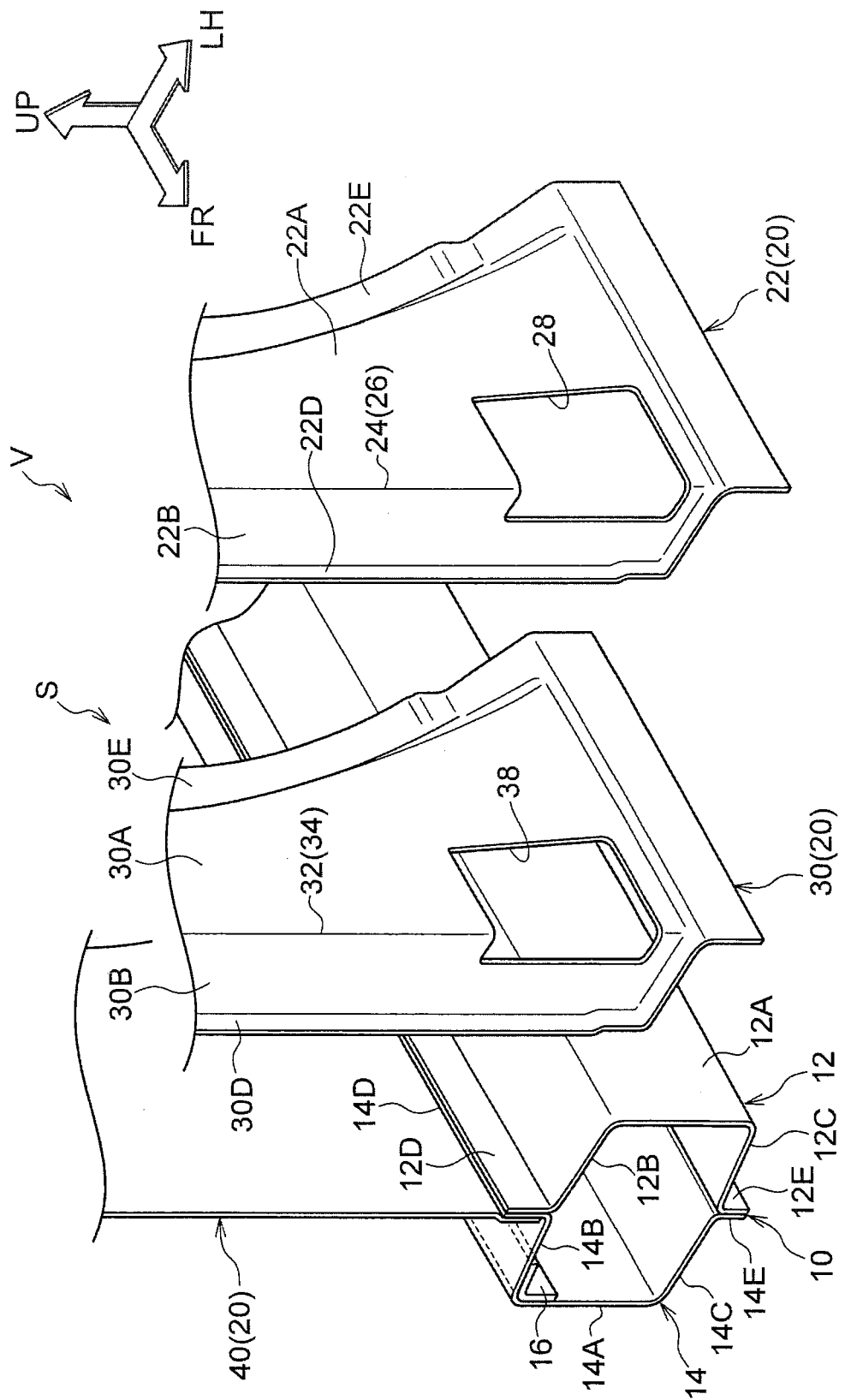
FIG. 1 is a partially exploded perspective view schematically illustrating a front end portion of a rocker and a lower end portion of a front pillar in a vehicle applied with a vehicle side section structure according to an exemplary embodiment, as viewed from the diagonal front left of the vehicle.

Explanation follows regarding a vehicle (car) V applied with a vehicle side section structure S according to an exemplary embodiment of the present invention, with reference to the drawings. Note that in the drawings the arrow FR indicates the vehicle front direction, the arrow UP indicates the vehicle upward direction, and the arrow LH indicates the left of the vehicle (one vehicle width direction side), as appropriate. In the following, reference simply to the longitudinal, vertical, and lateral directions refers to the front and rear in the vehicle longitudinal direction, up and down in the vehicle vertical direction, and the left and right of the vehicle (when facing forward), unless specifically indicated otherwise.

The vehicle side section structure S is applied at a location to the rear side of a front wheel W of the vehicle V, and is configured with lateral symmetry in the vehicle width direction. In the following explanation, explanation is given regarding a left side section of the vehicle V, and explanation regarding a right side section of the vehicle V is omitted.

As illustrated in FIG. 2, the vehicle V is configured including rockers 10 extending in the longitudinal direction at lower sections on both vehicle width direction sides of the vehicle V, and front pillars 20 extending from front end portions of the rockers 10 toward the upper side. The rockers 10 and the front pillars 20 are members with closed cross-section profiles that configure vehicle framework, and, together with roof side rails and center pillars, not illustrated in the drawings, form door openings through which occupants board and alight. Explanation follows regarding respective configurations thereof.

Figure 3A:
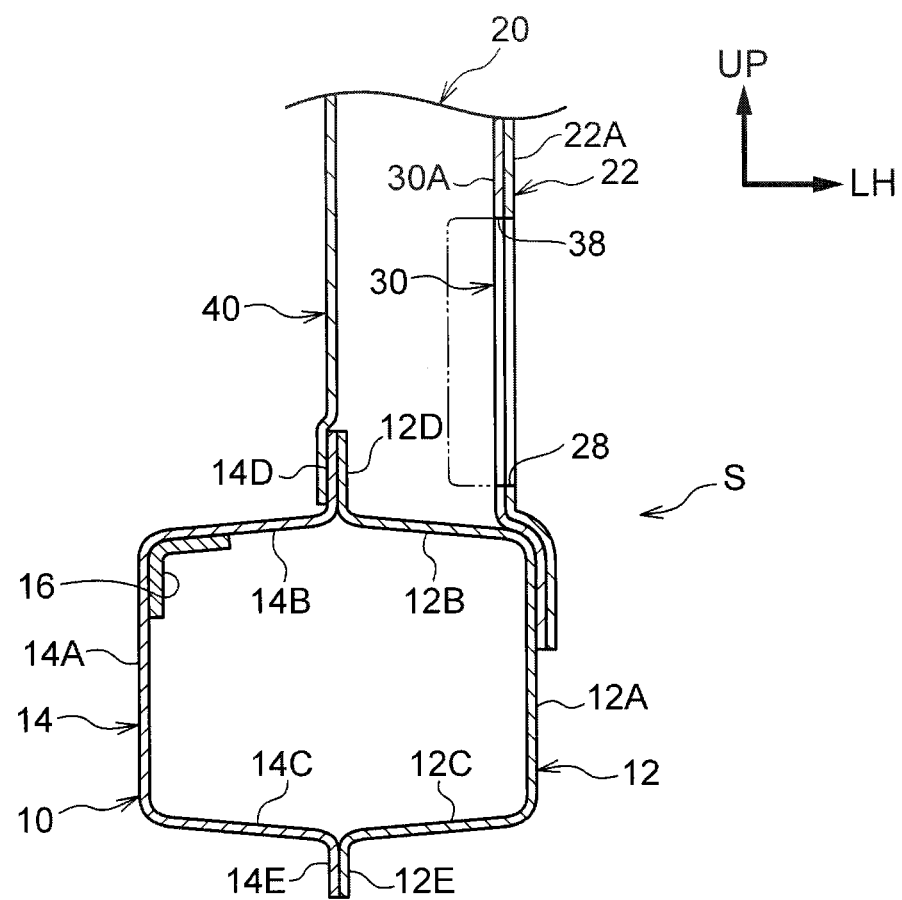
FIG. 3A is a cross-section (a cross-section along line 3A-3A in FIG. 2) of the front end portion of the rocker illustrated in FIG. 2, as viewed from the vehicle front side.

Each rocker 10 is disposed at the rear side of the respective front wheel W. The rocker 10 includes a rocker outer panel 12, and the rocker outer panel 12 configures a vehicle width direction outside portion of the rocker 10. The rocker outer panel 12 is manufactured from sheet steel, and is formed in an elongated shape with its length direction in the longitudinal direction, with a substantially hat shaped cross-section profile open toward the vehicle width direction inside as viewed from the front. Specifically, as illustrated in FIG. 3A, the rocker outer panel 12 includes a side wall 12A disposed with its plate thickness direction in the vehicle width direction, an upper wall 12B extending from an upper end of the side wall 12A toward the vehicle width direction inside, and a lower wall 12C extending from a lower end of the side wall 12A toward the vehicle width direction inside. The rocker outer panel 12 is further configured including a flange 12D jutting out from a vehicle width direction inside end of the upper wall 12B toward the upper side, and a flange 12E jutting out from a vehicle width direction inside end of the lower wall 12C toward the lower side.

A rocker inner panel 14 is provided at the vehicle width direction inside of the rocker outer panel 12. The rocker inner panel 14 is manufactured from sheet steel, and is configured with substantially lateral symmetry to the rocker outer panel 12. Specifically, the rocker inner panel 14 is configured including a side wall 14A disposed with its plate thickness direction in the vehicle width direction, an upper wall 14B extending from an upper end of the side wall 14A toward the vehicle width direction outside, and a lower wall 14C extending from a lower end of the side wall 14A toward the vehicle width direction outside. The rocker inner panel 14 is further configured including a flange 14D jutting out from a vehicle width direction outside end of the upper wall 14B toward the upper side, and a flange 14E jutting out from a vehicle width direction outside end of the lower wall 14C toward the lower side.

The flange 14D is joined to the flange 12D of the rocker outer panel 12 by spot welding or the like, and the flange 14E is joined to the flange 12E of the rocker outer panel 12 by spot welding or the like. The rocker 10 is thus formed with a closed cross-section structure. In FIG. 1, FIG. 2, and FIG. 3A, the rocker outer panel 12 and the rocker inner panel 14 are illustrated with the same plate thickness as each other for the sake of simplicity; however in the present exemplary embodiment, the plate thickness of the rocker inner panel 14 is set thicker than the plate thickness of the rocker outer panel 12. A vehicle width direction inside portion of the rocker 10 is accordingly set with higher strength than a vehicle width direction outside portion.

As illustrated in FIG. 2 and FIG. 3A, a patch 16 (in broad terms, an element understood as a "reinforcement member") is provided inside a front end portion of the rocker 10. The patch 16 is manufactured from sheet steel, and is formed in a substantially elongated shape with its length direction in the longitudinal direction, with an inverted, substantially L-shaped profile as viewed from the front. The patch 16 is joined to the upper wall 14B and the side wall 14A of the rocker inner panel 14 by spot welding or the like. The strength of the vehicle width direction inside portion of the rocker 10 is thereby further increased.

As illustrated in FIG. 1, each front pillar 20 is configured including a front pillar outer panel 22 (referred to below simply as the "pillar outer panel 22") configuring a vehicle width direction outside portion of the front pillar 20, front pillar outer reinforcement 30 (referred to below as "pillar outer reinforcement 30"), serving as "reinforcement" that reinforces the front pillar 20, and a front pillar inner panel 40 (referred to below simply as the "pillar inner panel 40") configuring a vehicle width direction inside portion of the front pillar 20.

Figure 3B:
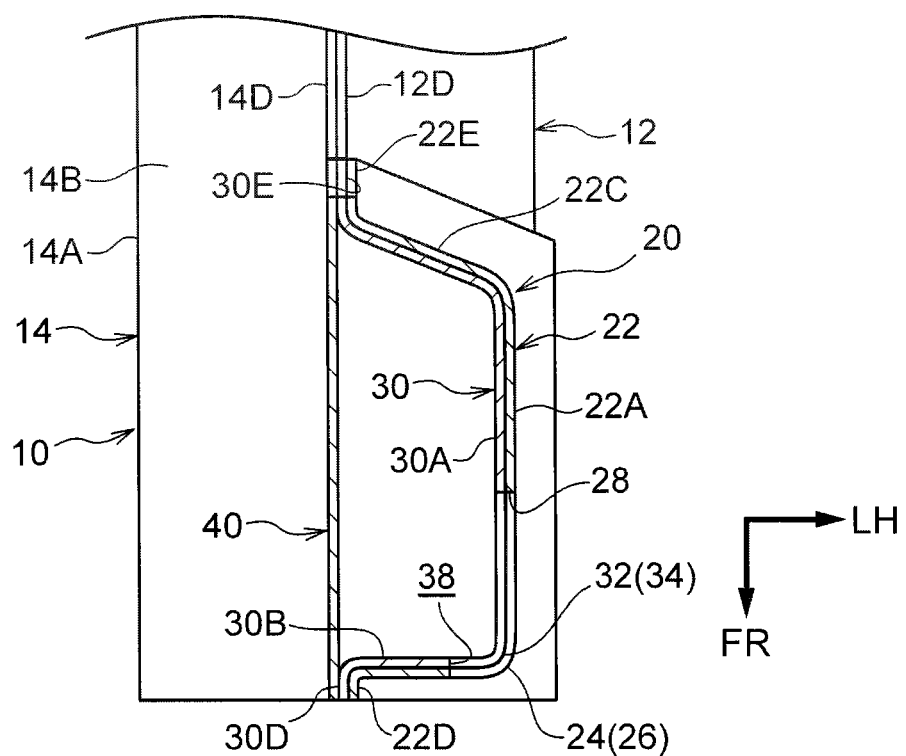
FIG. 3B is a cross-section (a cross-section along line 3B-3B in FIG. 2) of the lower end portion of the front pillar illustrated in FIG. 2, as viewed from the vehicle upper side.

The pillar outer panel 22 is manufactured from sheet steel, and is formed by pressing or the like. The pillar outer panel 22 extends in the vertical direction, and is formed in a substantially hat shape (recessed profile) open toward the vehicle width direction inside in plan cross-section view. Specifically, as illustrated in FIG. 3B, the pillar outer panel 22 is configured including a side wall 22A with its plate thickness direction in the vehicle width direction, a front wall 22B extending from a front end of the side wall 22A toward the vehicle width direction inside, and a rear wall 22C extending from a rear end of the side wall 22A toward the vehicle width direction inside. The pillar outer panel 22 further includes a flange 22D jutting out from a vehicle width direction inside end of the front wall 22B toward the front side, and a flange 22E jutting out from a vehicle width direction inside end of the rear wall 22C toward the rear side. The flanges 22D, 22E of the pillar outer panel 22 may be omitted, such that the pillar outer panel 22 is formed with a substantially U-shaped profile (recessed profile) open toward the vehicle width direction inside in plan cross-section view.

As illustrated in FIG. 1, a boundary portion between the side wall 22A and the front wall 22B of the pillar outer panel 22 (a corner portion at the front side and vehicle width direction outside of the pillar outer panel 22) configures a bent portion 24, and the bent portion 24 forms a bend ridge line 26 extending in the vertical direction in the pillar outer panel 22.

The pillar outer reinforcement 30 is manufactured from sheet steel, and is formed by pressing or the like. The pillar outer reinforcement 30 extends in the vertical direction, is formed with a substantially hat shaped profile open toward the vehicle width direction inside in plan cross-section view, and is disposed following inner peripheral faces of the pillar outer panel 22. Specifically, as illustrated in FIG. 3B, the pillar outer reinforcement 30 is configured including a side wall 30A with its plate thickness direction in the vehicle width direction, a front wall 30B extending from a front end of the side wall 30A toward the vehicle width direction inside, and a rear wall 30C extending from a rear end of the side wall 30A toward the vehicle width direction inside. The pillar outer reinforcement 30 further includes a flange 30D jutting out from a vehicle width direction inside end of the front wall 30B toward the front side, and a flange 30E jutting out from a vehicle width direction inside end of the rear wall 30C toward the rear side.

As illustrated in FIG. 1, a boundary portion between the side wall 30A and the front wall 30B of the pillar outer reinforcement 30 (a corner portion at the front side and vehicle width direction outside of the pillar outer reinforcement 30) configures a bent portion 32, and the bent portion 32 forms a bend ridge line 34 extending in the vertical direction in the pillar outer reinforcement 30. The pillar outer reinforcement 30 is joined to the pillar outer panel 22 by spot welding or the like, integrating the pillar outer reinforcement 30 and the pillar outer panel 22 together.

The pillar inner panel 40 is manufactured from sheet steel, and is disposed on the vehicle width direction inside of the pillar outer panel 22 and the pillar outer reinforcement 30, extending in the vertical direction with its plate thickness direction in the vehicle width direction. The flange 30D and the flange 30E of the pillar outer reinforcement 30 are joined to the pillar inner panel 40 by spot welding or the like. The front pillar 20 is thus formed with a closed cross-section structure (see FIG. 3B). The front pillar 20 is disposed at the upper side of the rocker outer panel 12, and a lower end portion of the front pillar 20 is joined to a front end portion of the rocker 10. Specifically, the pillar inner panel 40 is disposed at the rear side of a vehicle width direction outside portion of the front wheel W.

As illustrated in FIG. 1, a first opening 28, serving as a "first hole", is formed penetrating a lower end portion of the pillar outer panel 22 described above, at a height overlapping with the front wheel W in the vertical direction. The first opening 28 is formed so as to have a substantially rectangular shape in an opened-out state of the pillar outer panel 22. The first opening 28 is formed at a vehicle width direction outside portion at a front portion of the pillar outer panel 22 (referred to below as the front outside portion). Specifically, the first opening 28 extends from a longitudinal direction intermediate portion of the side wall 22A toward the front side, and extends past the bent portion 24 to a vehicle width direction intermediate portion of the front wall 22B. The bend ridge line 26 (bent portion 24) extending in the vertical direction is accordingly interrupted by the first opening 28 at a lower end portion of the pillar outer panel 22, configuring the pillar outer panel 22 with reduced strength at the front outside portion.

A second opening 38 that serves as a "second hole" and that has a substantially rectangular shape in a state in which the pillar outer reinforcement 30 is opened out similarly to the pillar outer panel 22, is formed penetrating a lower end portion of the pillar outer reinforcement 30. The second opening 38 is formed at a vehicle width direction outside portion at a front portion of the pillar outer reinforcement 30

(referred to below as the front outside portion). Specifically, the second opening 38 extends from a longitudinal direction intermediate portion to the front side of the side wall 30A, and extends past the bent portion 32 to a vehicle width direction intermediate portion of the front wall 30B. The bend ridge line 34 (bent portion 32) extending in the vertical direction is accordingly interrupted by the second opening 38 at a lower end portion of the pillar outer reinforcement 30, configuring the pillar outer reinforcement 30 with reduced strength at the front outside portion.

The size of the second opening 38 is set substantially the same as the size of the first opening 28 of the pillar outer panel 22, and the vertical position of the second opening 38 is set at substantially the same position as the vertical position of the first opening 28. The first opening 28 and the second opening 38 are disposed facing each other along the plate thickness directions of the pillar outer panel 22 (pillar outer reinforcement 30). At the lower end portion of the front pillar 20, the interior and the exterior of the front pillar 20 are thus placed in communication with each other through the first opening 28 and the second opening 38.

Although not shown in the drawings, a side outer panel is provided at the vehicle width direction outside of the rocker 10 and the front pillar 20, and the side outer panel covers the rocker 10 and the front pillar 20 from the vehicle width direction outside and front side. Namely, the first opening 28 and the second opening 38 of the front pillar 20 are not exposed, due to the side outer panel.

Explanation follows regarding operation and advantageous effects of the present exemplary embodiment.

Figure 4:
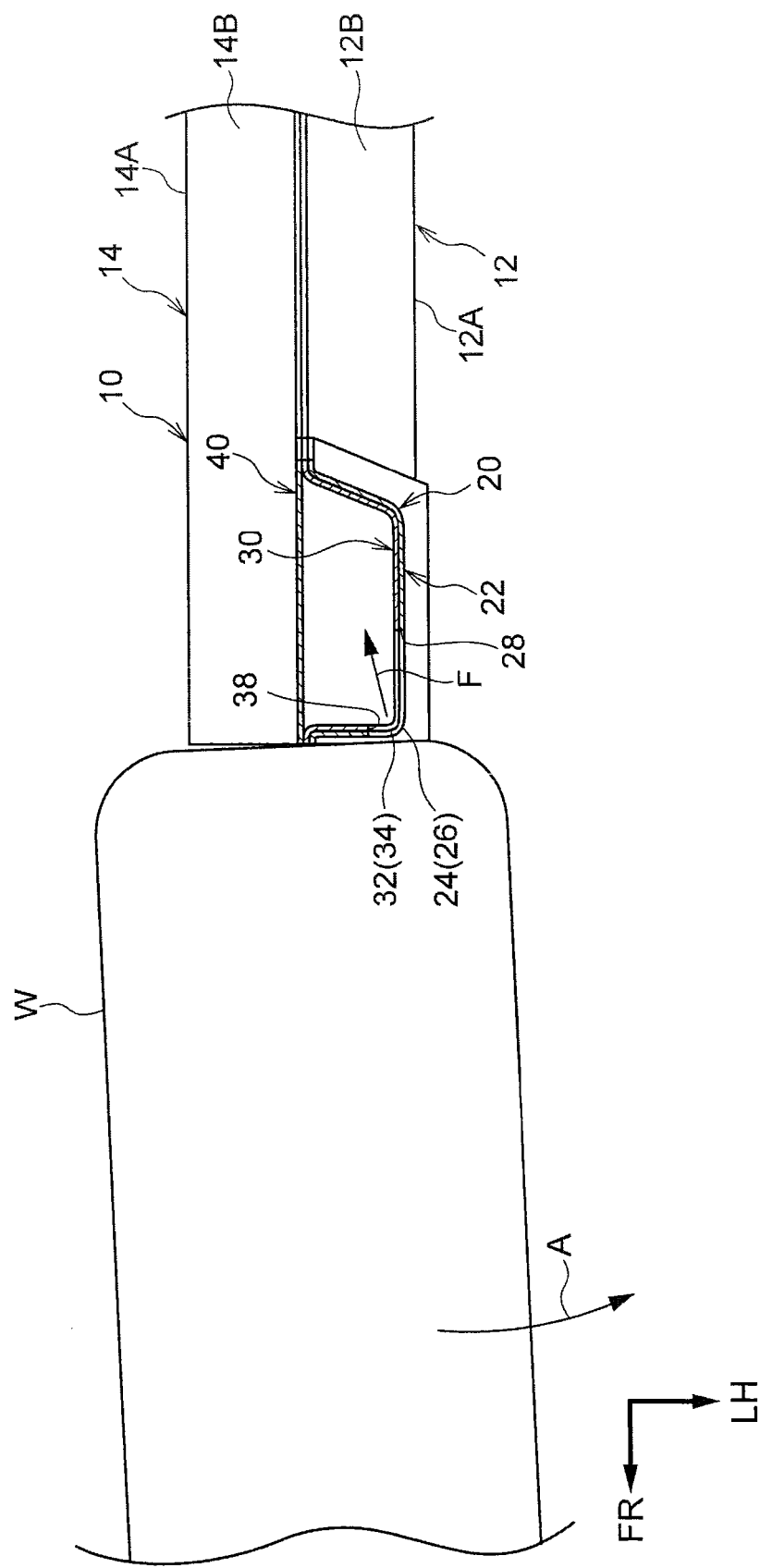
FIG. 4 is a partially cut away explanatory drawing to explain behavior of a front wheel, illustrated in FIG. 2, that has contacted a lower end portion of the front pillar in a small overlap collision of the vehicle, as viewed from the vehicle upper side.

In the vehicle V applied with the vehicle side section structure S configured as described above, in the event of the vehicle V being involved in a small overlap collision, the front wheel W is shunted backward by the colliding body (a barrier), and a rear end portion of the front wheel W contacts the lower end portion of the front pillar 20 and the front end portion of the rocker 10. In a small overlap collision, the colliding body enters the vehicle V further to the vehicle width direction outside than a front side member (not illustrated in the drawings) of the vehicle V, and so, as illustrated in FIG. 4, the front wheel W tends to be shunted backward while undergoing toe-out (a state in which a front end portion of the front wheel W is positioned at the vehicle width direction outside). Accordingly, when the rear end portion of the front wheel W that has been shunted backward contacts the lower end portion of the front pillar 20 and the front end portion of the rocker 10, load F (see FIG. 4) toward the rear side and the vehicle width direction inside (referred to below as the rear oblique inside) acts on the lower end portion of the front pillar 20 and the front end portion of the rocker 10.

The first opening 28 is formed at the lower end portion of the pillar outer panel 22 at the location of the bent portion 24, and the second opening 38 is formed at the lower end portion of the pillar outer reinforcement 30 at the location of the bent portion 32. The lower end portions of the pillar outer panel 22 and the pillar outer reinforcement 30 are accordingly reduced in strength at their respective front outside portions. Accordingly, when the rear oblique inside load F acts on the lower end portion of the front pillar 20, the front pillar 20 deforms about an origin at the front outside portions of the pillar outer panel 22 and the pillar outer reinforcement 30. Namely, the front pillar 20 can be made deform such that the front end portion of the front wheel W moves further to the vehicle width direction outside (toward the arrow A direction side in FIG. 4) (causing greater toe-out of the front wheel W). The front wheel W accordingly turns such that the front end portion of the front wheel W moves further to the vehicle width direction outside, promoting toe-out of the front wheel W.

More detailed explanation follows regarding this point. Namely, in a small overlap collision, deforming the front outside portion (more specifically, a portion peripheral to the bent portion 24 of the pillar outer panel 22) of the front pillar 20 is an effective way to promote toe-out of the front wheel W when the front wheel W that has been shunted backward while undergoing toe-out contacts the lower end portion of the front pillar 20.

Since the bend ridge line 26 (bend ridge line 34) extends continuously in the vertical direction at the bent portion 24 (bent portion 32) of the pillar outer panel 22 (pillar outer reinforcement 30), the portion peripheral to the bent portion 24 (bent portion 32) is generally of high strength. The front outside portion of the front pillar 20 is accordingly configured with comparatively high strength due to the bent portion 24 (bent portion 32). Therefore, supposing the first opening 28 (second opening 38) were to be omitted from the pillar outer panel 22 (pillar outer reinforcement 30), a comparatively larger reaction force would act on the front wheel W from the front wall 22B (front wall 30B) and the side wall 22A (side wall 30A) of the pillar outer panel 22 (pillar outer reinforcement 30), such that it may not be possible to promote toe-out of the front wheel W.

However, in the present exemplary embodiment, the first opening 28 (second opening 38) is formed at the location of the bent portion 24 (bent portion 32), thereby interrupting the bent portion 24 (bent portion 32) at the lower end portion of the pillar outer panel 22 (pillar outer reinforcement 30). The strength of the front outside portion, otherwise configured with comparatively high strength, can thereby be effectively reduced at the lower end portion of the pillar outer panel 22 (pillar outer reinforcement 30). This thereby enables the front outside portion of the pillar outer panel 22 (pillar outer reinforcement 30) of the front pillar 20 to undergo effective deformation, and enables the reaction force acting on the front wheel W from the front wall 22B (front wall 30B) and the side wall 22A (side wall 30A) of the front pillar outer panel 22 (pillar outer reinforcement 30) to be reduced, when the rear end portion of the front wheel W contacts the lower end portion of the front pillar 20 in a small overlap collision. This thereby enables toe-out of the front wheel W to be promoted in a small overlap collision.

After the front wheel W has contacted the lower end portion of the front pillar 20, the front wheel W undergoes toe-out as it is shunted backward, while front outside portions of the lower end portions of the pillar outer panel 22 and the pillar outer reinforcement 30 undergo deformation. This thereby enables toe-out of the front wheel W to be promoted while collision energy is absorbed in the deformation of the pillar outer panel 22 and the pillar outer reinforcement 30. This thereby enables a reduction in the collision load input to the rocker 10 in a small overlap collision. Moreover, as described above, the front wheel W undergoes toe-out as it is shunted backward after the front wheel W has contacted the lower end portion of the front pillar 20, such that the colliding body can be displaced toward the vehicle width direction outside of the vehicle V. The colliding body and the vehicle V can accordingly be moved apart from each other in the vehicle width direction.

In a front offset collision of the vehicle V (a front offset collision overlapping with the vehicle V over a range of 50% in the vehicle width direction), the collision body (barrier) enters the vehicle V while deforming the front side member of the vehicle V, and the front wheel W tends to be shunted backward with hardly any change in orientation. Accordingly, when the rear end portion of the front wheel W that has been shunted backward contacts the lower end portion of the front pillar 20 and the front end portion of the rocker 10, the front wheel W is caught between the rocker 10 and the front pillar 20, and the colliding body, and collision load acts on the lower end portion of the front pillar 20 and the front end portion of the rocker 10, mainly toward the rear side. The rocker 10 and the front pillar 20 can accordingly catch the front wheel W that has been shunted backward, enabling collision load to be transmitted toward the rear side by the rocker 10.

Regarding the point of lowering the strength of a vehicle width direction outside portion of the pillar outer panel 22 (pillar outer reinforcement 30), reducing the plate thickness of the side wall 22A (side wall 30A) of the pillar outer panel 22 (pillar outer reinforcement 30) may be considered, as in the related art. However, in such cases, the bent portion 24 (bent portion 32) of the pillar outer panel 22 (pillar outer reinforcement 30) is not interrupted. Namely, the strength of the front outside portion (the portion peripheral to the bent portion 24 (bent portion 32)) at the lower end portion of the pillar outer panel 22 (pillar outer reinforcement 30) cannot be effectively lowered. By contrast, in the present exemplary embodiment, forming the first opening 28 (second opening 38) to the pillar outer panel 22 (pillar outer reinforcement 30) as described above enables the bent portion 24 (bent portion 32) of the pillar outer panel 22 (pillar outer reinforcement 30) to be interrupted. This thereby enables the strength of the front outside portion of the front pillar 20 to be more effectively lowered in the present exemplary embodiment than in the related art described above. Moreover, in the present exemplary embodiment, the pillar outer panel 22 (pillar outer reinforcement 30) can be set with a uniform plate thickness, enabling easier molding of the pillar outer panel 22 (pillar outer reinforcement 30) than in the related art described above.

In the present exemplary embodiment, the pillar outer reinforcement 30 is provided inside the pillar outer panel 22 as described above, and the pillar outer reinforcement 30 is formed with the second opening 38. The second opening 38 is disposed facing the first opening 28 along the plate thickness directions of the pillar outer panel 22. This thereby enables the front outside portion of the pillar outer panel 22 to be deformed as desired, while the pillar outer reinforcement 30 reinforces the front pillar 20.

In the present exemplary embodiment, the second opening 38 is formed at the lower end portion of the pillar outer reinforcement 30; however the second opening 38 may be omitted from the pillar outer reinforcement 30. Such a configuration still enables the strength of the front outside portion of the front pillar 20 to be lowered, due to forming the first opening 28 in the pillar outer panel 22.

Figure 5A:
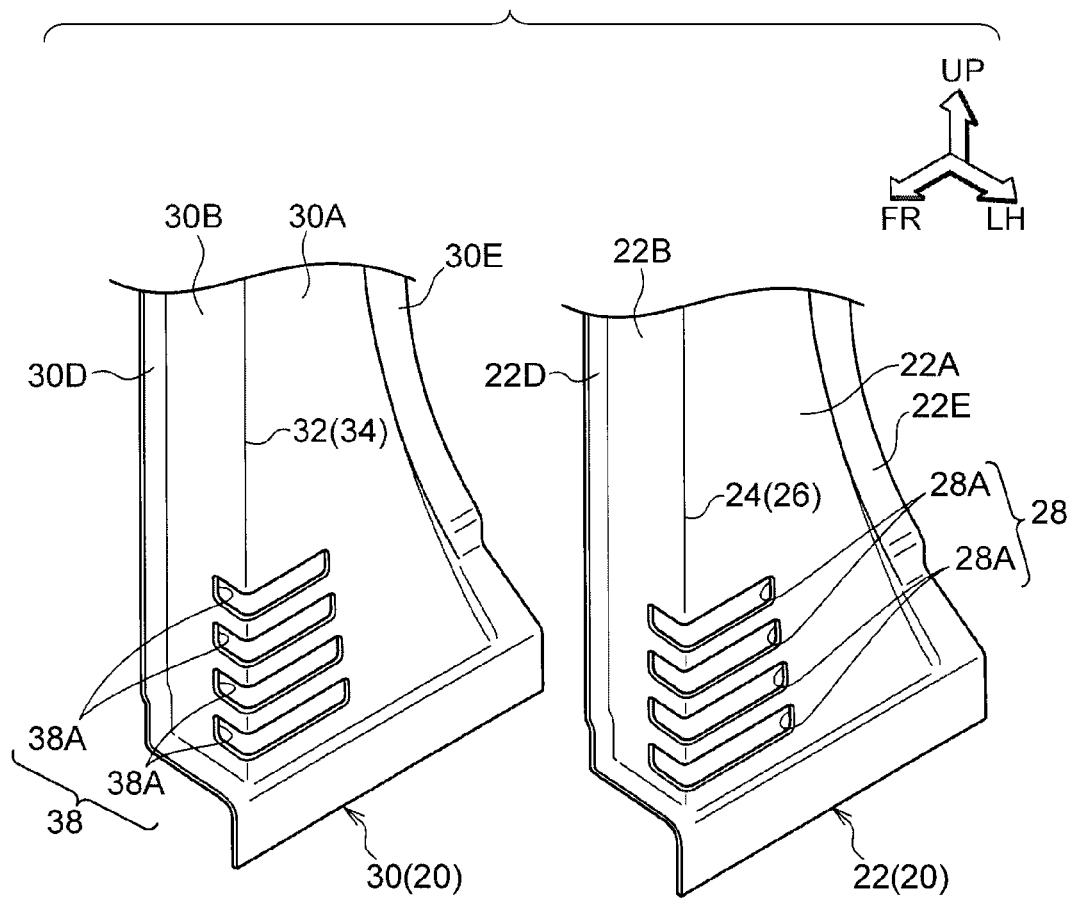
FIG. 5A is a perspective view illustrating a modified example of a first opening and second opening illustrated in FIG. 1, as viewed from the diagonal front left of the vehicle.

In the present exemplary embodiment, the first opening 28 and the second opening 38 are configured by single holes; however the first opening 28 and the second opening 38 may be configured by plural slits. For example, as illustrated in FIG. 5A, the first opening 28 (second opening 38) may be configured by plural slits 28A (slits 38A) extending in a horizontal direction. In such cases, the bend ridge line 26 (bend ridge line 34) can be interrupted by the slits 28A (slits 38A) at the lower end portion of the pillar outer panel 22 (pillar outer reinforcement 30) due to forming the plural slits 28A (slits 38A) at the bent portion 24 (bent portion 32). This thereby enables an effective reduction in strength of the front outside portion at the lower end portion of the pillar outer panel 22 (pillar outer reinforcement 30).

Figure 5B:
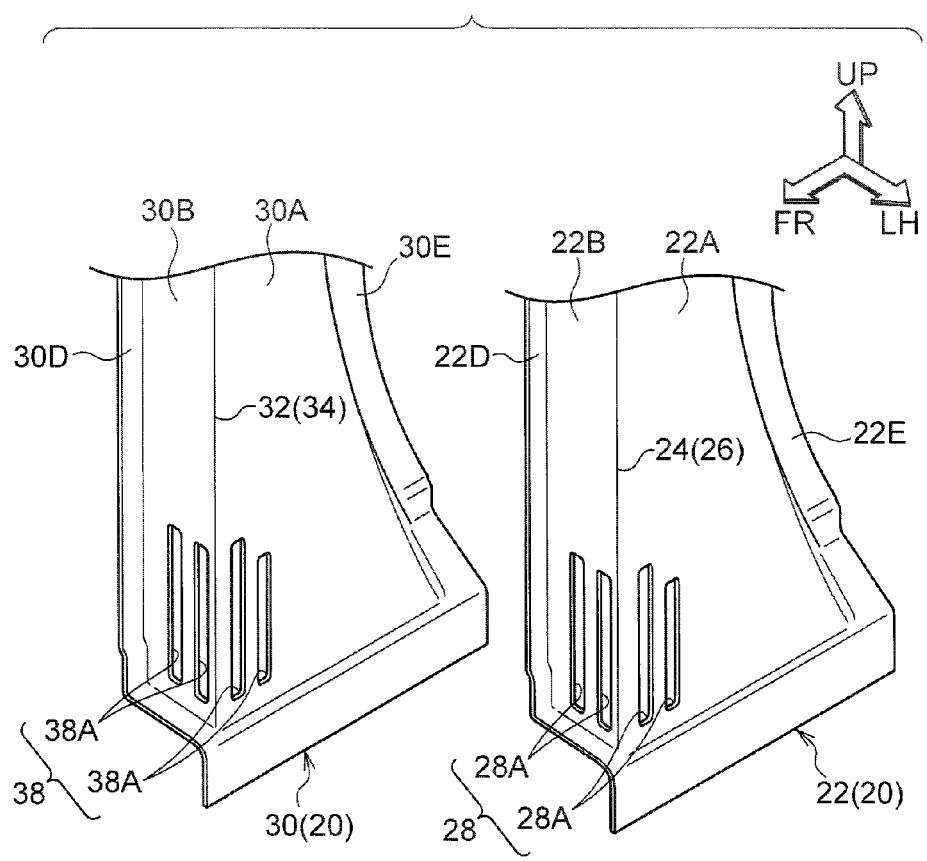
FIG. 5B is a perspective view illustrating another modified example of the first opening and second opening illustrated in FIG. 1, as viewed from the diagonal front left of the vehicle.

As illustrated in FIG. 5B, for example, the first opening 28 (second opening 38) may be configured by plural slits 28A (slits 38A) extending in the vertical direction, and the slits 28A (slits 38A) may be formed to the side wall 22A (side wall 30A) and the front wall 22B (front wall 30B) of the pillar outer panel 22 (pillar outer reinforcement 30). Moreover, in such cases, the bent portion 24 (bent portion 32) may be set so as to be disposed between the respective slits 28A (slits 38A) formed to the side wall 22A (side wall 30A) and the front wall 22B (front wall 30B). In such cases, although the bend ridge line 26 (bend ridge line 34) is not interrupted by the slits 28A (slits 38A), the strength of the front outside portion of the lower end portion of the pillar outer panel 22 (pillar outer reinforcement 30) can still be effectively lowered due to forming the respective slits 28A (slits 38A) to the side wall 22A (side wall 30A) and the front wall 22B (front wall 30B).

In the present exemplary embodiment, the pillar outer reinforcement 30 is formed with a substantially hat shaped profile, opening toward the vehicle width direction inside in plan cross-section view; however the plan cross-section profile of the pillar outer reinforcement 30 is not limited thereto. For example, the plan cross-section profile of the pillar outer reinforcement 30 may be configured as in the four modified examples described below. Note that the second opening 38 of the pillar outer reinforcement 30 may be omitted in the modified examples described below.

Figure 6A:
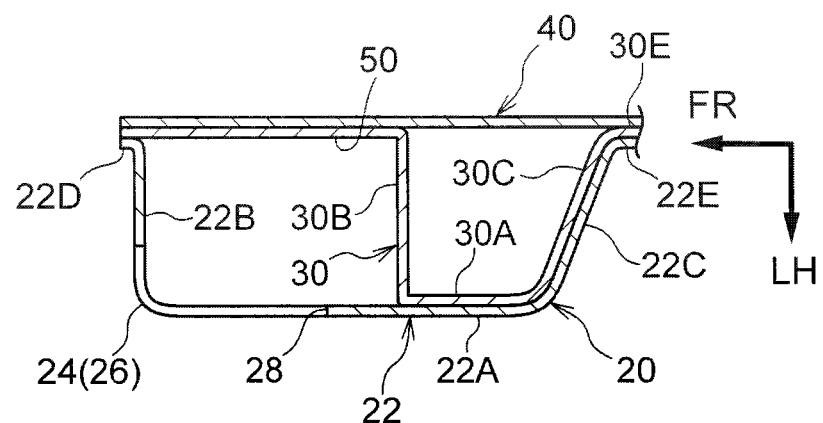

As illustrated in FIG. 6A, in a first modified example of the pillar outer reinforcement 30, a substantially L-shaped step 50, serving as a "set-back portion" open toward the vehicle width direction outside and the front side, is formed at a front portion of the pillar outer reinforcement 30, with the front wall 30B of the pillar outer reinforcement 30 disposed at a rear side thereof. The step 50 is configured to form a closed cross-section with the side wall 22A and front wall 22B of the pillar outer panel 22. Accordingly, in the first modified example, the step 50 is disposed set back (separated) to the rear side and vehicle width direction inside of the bent portion 24 (first opening 28) of the pillar outer panel 22. Namely, the step 50 is set back in the load direction of the load F mentioned above with respect to the bent portion 24 (first opening 28) of the pillar outer panel 22. This thereby enables the pillar outer reinforcement 30 to be suppressed from obstructing deformation of the front outside portion of the pillar outer panel 22. The front pillar 20 can accordingly be deformed about an origin at the front outside portion of the front pillar 20 in a small overlap collision, while the front pillar 20 is reinforced by the pillar outer reinforcement 30. Note that in FIG. 6A, the step 50 is configured by two walls extending at right angles to each other in plan cross-section view; however, the step 50 may be configured by a curved wall in plan cross-section view.

Figure 6B:
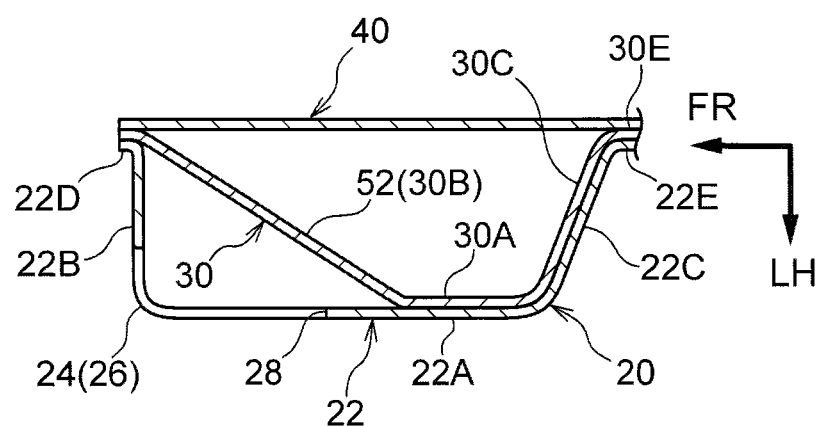

As illustrated in FIG. 6B, in a second modified example of the pillar outer reinforcement 30, the front wall 30B is configured by an angled portion 52, serving as a "set-back portion" that is disposed at an angle toward the rear side on progression toward the vehicle width direction outside when the front wall 30B is viewed from the upper side. Similarly to in the first modified example, in the second modified example the side wall 22A and front wall 22B of the pillar outer panel 22 form a closed cross-section with the angled portion 52, and the angled portion 52 is disposed set back (separated) to the rear side and vehicle width direction inside of the bent portion 24 (first opening 28) of the pillar outer panel 22. Such a configuration accordingly enables the pillar outer reinforcement 30 to be suppressed from obstructing deformation of the front outside portion of the pillar outer panel 22. The second modified example accordingly enables similar operation and advantageous effects to the first modified example.

Figure 6C:
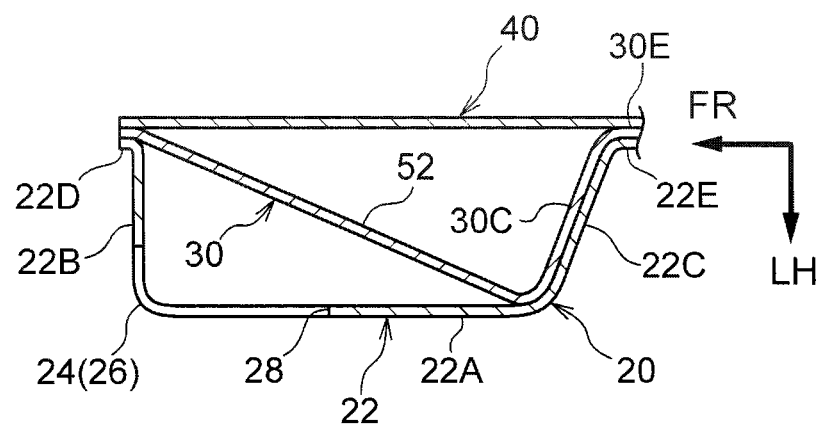

As illustrated in FIG. 6C, in a third modified example of the pillar outer reinforcement 30, the front wall 30B and the side wall 30A are omitted, and an angled portion 52 is formed at the rear side of the front wall 22B of the pillar outer panel 22, and as viewed from the upper side, is disposed at an angle toward the rear side on progression toward the vehicle width direction outside. A rear end of the angled portion 52 is connected to a vehicle width direction outside end of the rear wall 30C. Similarly to in the first modified example, in the third modified example, the side wall 22A and front wall 22B of the pillar outer panel 22 form a closed cross-section with the angled portion 52. The angled portion 52 is disposed set back (separated) to the rear side and vehicle width direction inside of the bent portion 24 (first opening 28) of the pillar outer panel 22. The third modified example can accordingly exhibit similar operation and advantageous effects to the first modified example. In FIG. 6B and FIG. 6C, the angled portions 52 are configured by a wall extending in a straight line in plan cross-section view; however, the angled portion 52 may be configured by a wall that is curved in plan cross-section view.

Figure 6D:
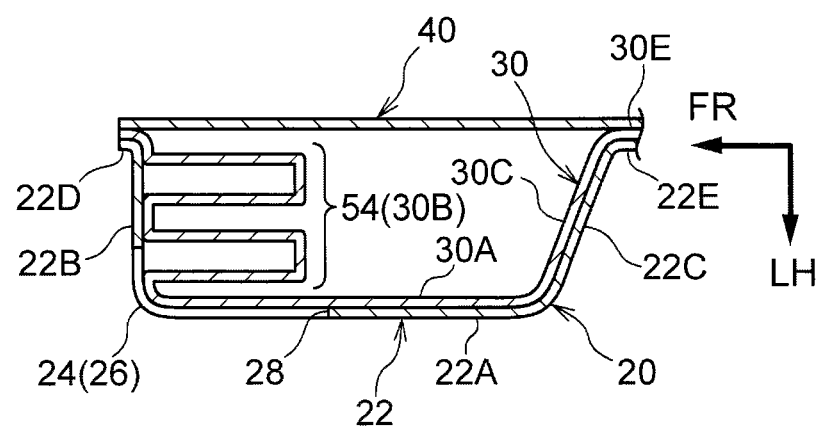

Moreover, as illustrated in FIG. 6D, in a fourth modified example of the pillar outer reinforcement 30, the front wall 30B may be configured as a concertina portion 54. Namely, the concertina portion 54 extends along the vehicle width direction in a concertina shape, so as to be capable of deforming in the vehicle width direction. Accordingly, the vehicle width direction strength of a front portion of the pillar outer reinforcement 30 is lowered in the fourth modified example, thereby enabling the pillar outer reinforcement 30 to be suppressed from obstructing deformation of the front pillar 20 toward the vehicle width direction inside about an origin at the front outside portion of the pillar outer panel 22 in a small overlap collision. The fourth modified example accordingly enables the front pillar 20 to be deformed about an origin at the front outside portion of the front pillar 20 in a small overlap collision, while the front pillar 20 is reinforced by the pillar outer reinforcement 30.

What is claimed is:

1. A vehicle side section structure comprising:
    a rocker extending in a vehicle longitudinal direction at a vehicle rear side of a front wheel;
    a front pillar configured with a closed cross-section structure and extending from a front end portion of the rocker toward a vehicle upper side;
    a front pillar outer panel that configures a vehicle width direction outside portion of the front pillar, that is bent into a recessed shape open toward the vehicle width direction inside as viewed in cross-section from the vehicle upper side, and that includes a bent portion configuring a corner at the vehicle front side and vehicle width direction outside of the front pillar outer panel; and
    a first hole formed at the corner, at a lower end portion of the front pillar outer panel at a height in a vehicle vertical direction that overlaps with the front wheel.

2. The vehicle side section structure of claim 1, wherein:
    a reinforcement that reinforces the front pillar is provided inside the front pillar; and
    the reinforcement is formed with a second hole disposed facing the first hole, or formed with a set-back portion that is set back to the vehicle rear side and vehicle width direction inside with respect to the first hole.

3. The vehicle side section structure of claim 2, wherein:
    the front pillar outer panel is configured including a front wall extending from the bent portion toward the vehicle width direction inside, and a side wall extending from the bent portion toward the vehicle rear side; and
    the set-back portion is configured by a step, or by an angled portion, that forms a closed cross-section with the front wall and the side wall as viewed from the vehicle upper side.

4. The vehicle side section structure of claim 1, wherein:
    the front pillar outer panel is configured including a front wall extending from the bent portion toward the vehicle width direction inside, and a side wall extending from the bent portion toward the vehicle rear side,
    the bent portion includes a bend ridge line which extends in a vertical direction, and
    the first hole extends from a longitudinal direction intermediate portion of the side wall toward the vehicle front side, and extends past the bent portion to a vehicle width direction intermediate portion of the front wall such that the bend ridge line is interrupted by the first opening.

* * * * *